United States Patent
Yamada

(10) Patent No.: US 7,586,690 B2
(45) Date of Patent: Sep. 8, 2009

(54) PROJECTION TYPE ZOOM LENS AND PROJECTION TYPE DISPLAY APPARATUS

(75) Inventor: Hiroshi Yamada, Saitama (JP)

(73) Assignee: Fujinon Corporation, Saitama-Shi (JP)

( * ) Notice: Subject to any disclaimer, the term of this patent is extended or adjusted under 35 U.S.C. 154(b) by 207 days.

(21) Appl. No.: 11/889,153

(22) Filed: Aug. 9, 2007

(65) Prior Publication Data
US 2008/0231962 A1 Sep. 25, 2008

(30) Foreign Application Priority Data
Aug. 11, 2006 (JP) ............................ P2006-220428

(51) Int. Cl.
G02B 15/14 (2006.01)
(52) U.S. Cl. ...................... 359/680; 359/676
(58) Field of Classification Search ................. 359/676, 359/680, 681, 682, 683
See application file for complete search history.

(56) References Cited

U.S. PATENT DOCUMENTS

| | | | |
|---|---|---|---|
| 6,738,196 B2 | 5/2004 | Yamamoto | |
| 6,747,815 B2 | 6/2004 | Takatsuki | |
| 6,801,367 B2 * | 10/2004 | Nagahara | 359/680 |
| 7,230,770 B2 * | 6/2007 | Kreitzer et al. | 359/649 |
| 2007/0263294 A1 * | 11/2007 | Yamada et al. | 359/680 |
| 2008/0316616 A1 * | 12/2008 | Kawana | 359/683 |

FOREIGN PATENT DOCUMENTS

| | | |
|---|---|---|
| JP | 2003-195169 A | 7/2003 |
| JP | 2003-222793 A | 8/2003 |
| JP | 2004-117519 A | 4/2004 |

* cited by examiner

*Primary Examiner*—David N Spector
(74) *Attorney, Agent, or Firm*—Birch, Stewart, Kolasch & Birch, LLP

(57) ABSTRACT

Disposed in order from a magnification side are a negative first group which is fixed during zooming to effect focusing, second to fifth groups of positive refractive power which move with mutual relationship during magnification variation, and a fixed sixth group. A negative lens made of a glass material which has an anomalous dispersion property and which has 70 or more in Abbe number is disposed in the first lens group. A positive lens made of a glass material which has an anomalous dispersion property and which has 70 or more in Abbe number is disposed in the third group located closer to a reduction side than a diaphragm. The negative lens and the positive lens are cemented to their adjacent lenses, respectively. Also, bf/fw $\geq 2.7$ is satisfied where bf denotes a back focus, and fw denotes a focal length of the entire system at a wide-angle end.

9 Claims, 13 Drawing Sheets

EXAMPLE 1

FIG. 1 EXAMPLE 1

FIG. 2 EXAMPLE 2

EXAMPLE 3

FIG. 4
EXAMPLE 1
WIDE
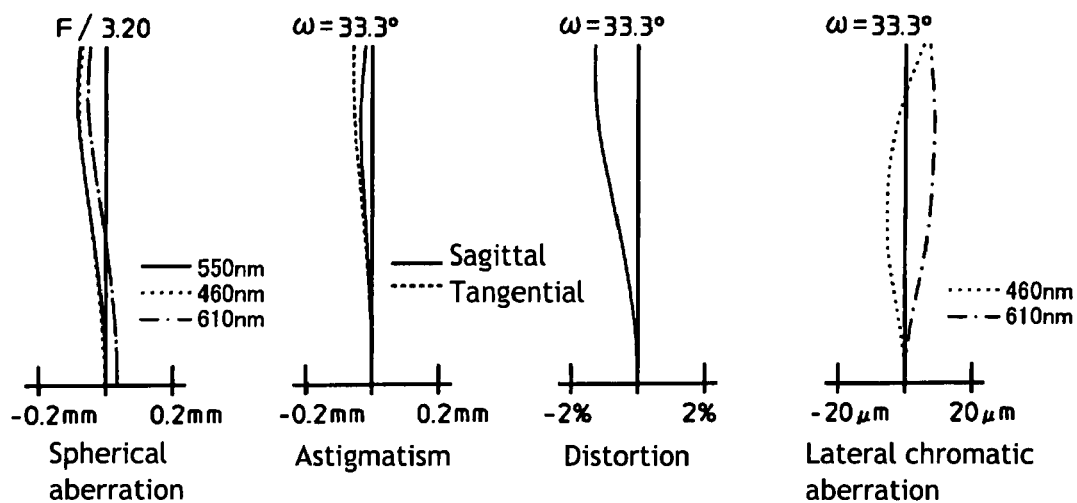
TELE
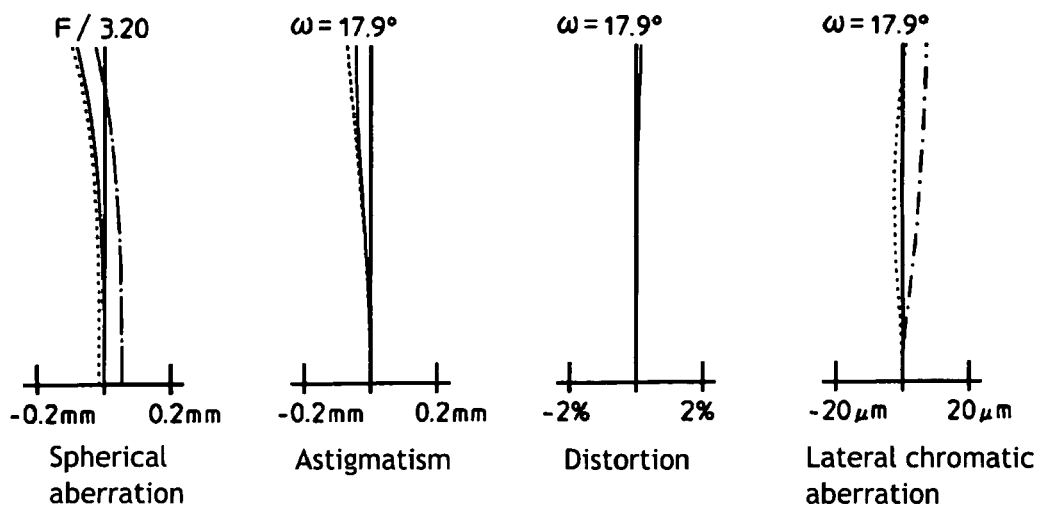

FIG. 7
EXAMPLE 2
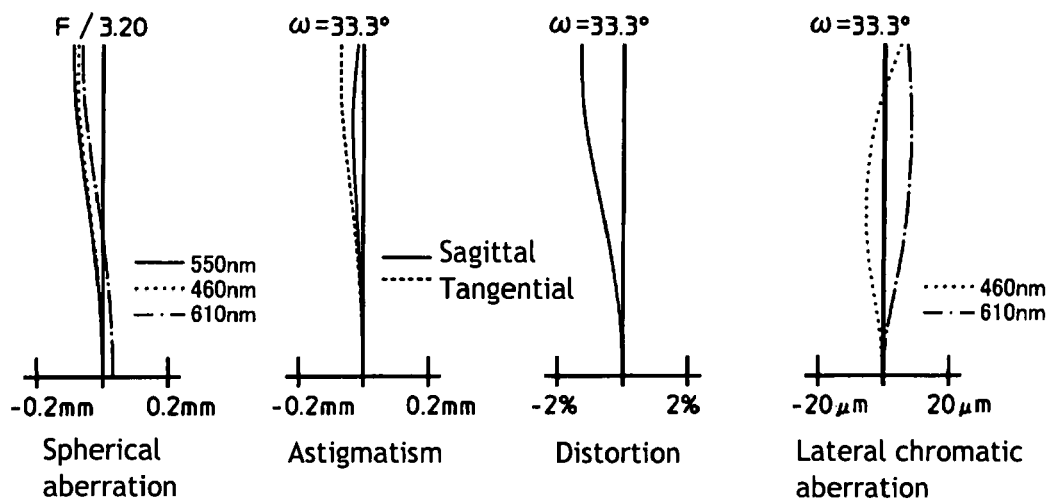
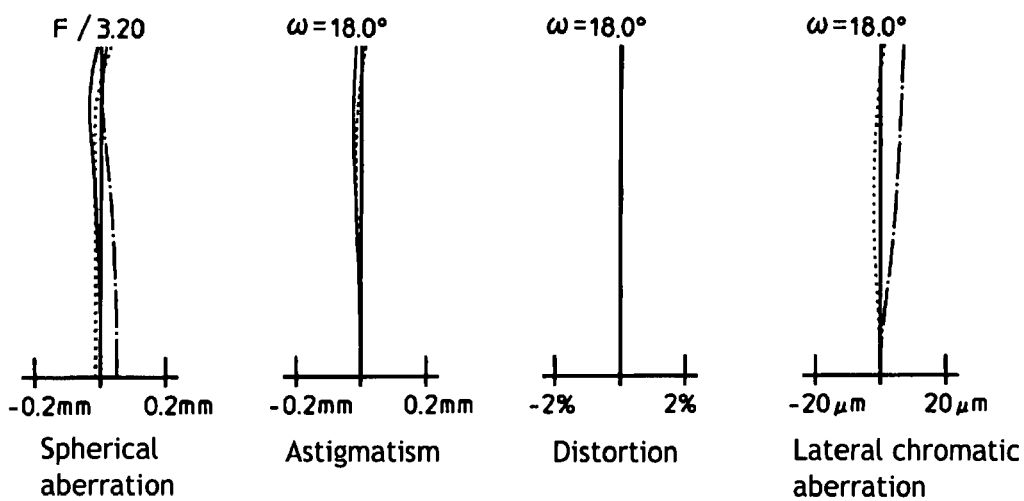

FIG. 10
EXAMPLE 3
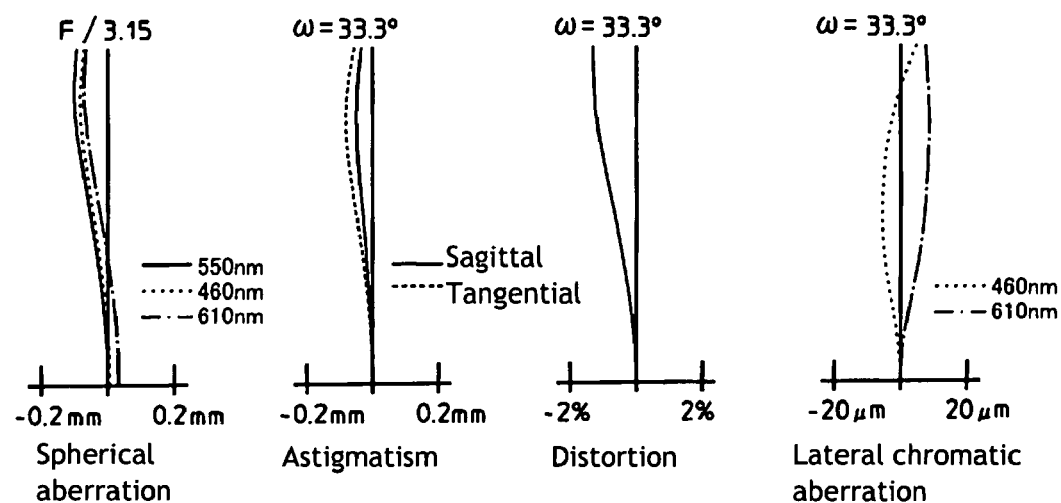
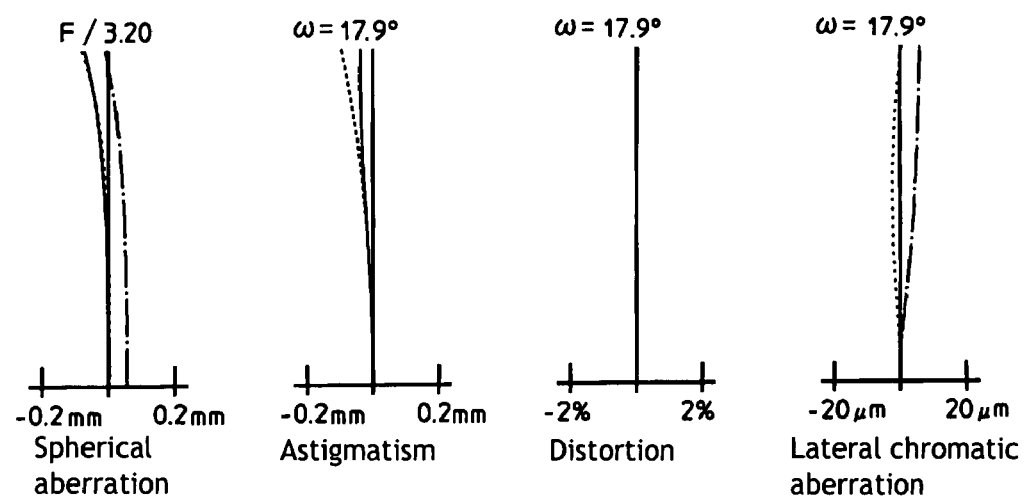

EXAMPLE 3 (WIDE)
COMATIC ABERRATION

PROJECTION TYPE ZOOM LENS AND PROJECTION TYPE DISPLAY APPARATUS

CROSS-REFERENCE TO RELATED APPLICATIONS

This application is based upon and claims the benefit of priority from the Japanese Patent Application No. 2006-220428 filed on Aug. 11, 2006, the entire contents of which are incorporated herein by reference.

BACKGROUND OF THE INVENTION

1. Technical Field

The invention relates to a projection type zoom lens which is mounted in a projection type display apparatus and the projection type display apparatus, and more particularly to a projection type zoom lens and a projection type display apparatus with temperature compensation being taken into consideration.

2. Description of the Related Art

In recent years, projection type projectors have been widely used, for example, at presentation situations. There has been a demand for further improvement in performance particularly in terms of chromatic aberration along with higher resolution of images which are supplied from personal computers or the like. It has been known that it is effective for correction of the lateral chromatic aberration in a projection lens of the projection type projector to use a glass material having an anomalous dispersion property as a positive lens (e.g. see JP 2004-117519 A). However, the anomalous dispersion glass material is opposite in sign of a temperature coefficient of a refractive index to a normal glass material. Therefore, if the power of the positive lens is made stronger, the point of focus would deviate.

In particular, in the projection type projector, a high-output light source is used. Therefore, heat from the light source is transmitted to a lens barrel through a mount and warms the lens. In addition, the light from the light source is radiated to a lens holding frame, a diaphragm, a barrel chamber, and the like and generates heat. Since the lens is warmed by this heat as well, the temperature of the respective lens elements increases substantially. Accordingly, since the powers of the positive lens cannot be made very strong, it is difficult to correct the lateral chromatic aberration substantially.

On the other hand, in an optical system of the projection type projector, as a technology for alleviating the deviation of the point of focus due to increase of temperature, it has been known to use a compound aspherical lens as a projection lens (see JP 2003-195169 A (corresponding to U.S. Pat. No. 6,738, 196)). The compound aspherical lens is one in which a thin plastic aspherical lens is cemented to a glass spherical lens. The deviation of the point of focus due to the plastic lens sensitive to a temperature change is alleviated by making the plastic lens thin. However, this technology alleviates the deviation of the point of focus due to the plastic lens and, of course, it does not essentially resolve the deviation of the point of focus associated with the temperature change in the case where the anomalous dispersion glass material is used as described above.

In view of these circumstances, in the projection lens of the projection type projector, there has been a demand for a technology for a simple configuration which makes it possible to effectively improve chromatic aberration by using an anomalous dispersion glass material and to improve the deviation of the point of focus associated with a temperature change in the case where the anomalous dispersion glass material is used.

In an imaging lens system of a fixed focus type, although not a projection lens of a projection type projector, the following technology has been known (JP 2003-222793 A (corresponding to U.S. Pat. No. 6,747,815)). Chromatic aberration is corrected by using a positive lens made of a glass material having an anomalous dispersion property, and the deviation of the point of focus associated with a temperature change, which occurs due to the use of this positive lens, is offset by using a negative lens made of a glass material having an anomalous dispersion property.

However, the technology of JP 2003-222793 A is applicable to an imaging lens system such as a television lens, and is not assumed to be used in a lens system whose temperature changes substantially as in the projection lens of a projection type projector. In addition, since the applicable object is a fixed focus lens, the configuration provided is not such that it takes into consideration the change in the relative positions of the lens groups during zooming.

SUMMARY OF THE INVENTION

The invention has been made in view of the above-described circumstances, and provides a high-performance projection type zoom lens of a projection type projector with a simple configuration, which while satisfactorily correcting chromatic aberration by using an anomalous dispersion glass material, is capable of satisfactorily compensating for the deviation of the point of focus associated with a temperature change, which occurs due to this anomalous dispersion glass material, as well as a projection type display apparatus using the same.

According to an aspect of the invention, a projection type zoom lens a first lens group having a negative refractive power, and second to sixth lens groups having positive refractive powers. The first to sixth lens groups are arranged in order from a magnification side. The first lens group includes at least one negative lens which has an anomalous dispersion property and which has 70 or more in Abbe number. At least one positive lens is included in the third to fifth lens group. The at least one positive lens has an anomalous dispersion property and has 70 or more in Abbe number. At least one of the negative lens having the anomalous dispersion property is cemented to a positive lens adjacent to the negative lens. At least one of the positive lens having the anomalous dispersion property is cemented to a negative lens adjacent to the positive lens. During variation of magnification, the second to fifth lens groups move and the first and sixth lens groups are fixed. During focus adjustment, the first lens group moves. The following conditional expression (1) is satisfied:

$$bf/fw \geq 2.7 \qquad (1)$$

where bf denotes a back focus, and fw denotes a focal length of the entire system at a wide-angle end.

Also, the following conditional expressions (2) and (3) may be satisfied:

$$3.0 \leq fw_{G12}/fw \leq 6.0 \qquad (2)$$

$$1.3 \leq d_{G23}/fw \leq 2.0 \qquad (3)$$

where $fw_{G12}$ denotes a combined focal length of the first and second lens groups at the wide-angle end, and $d_{G23}$ denotes an interval between the second and third lens groups at the wide-angle end.

Also, a diaphragm whose aperture diameter that varies in accordance with a magnification variation operation may be disposed between the second lens group and the third lens group.

The projection type zoom lens is particularly effective in the case where a magnification ratio is set to 1.8 or more.

According to another aspect of the invention, a projection type display apparatus includes a light source, a light valve, an illuminating optical system guiding a light beam from the light source to the light valve, and any of the projection type zoom lenses set forth above. The light beam from the light source is subjected to light modulation by the light valve, and is projected onto a screen by the projection type zoom lens.

According to the projection type zoom lens and the projection type display apparatus set forth above, during the variation of magnification, the second to fifth lens groups move, and the first and sixth lens groups are fixed. The first lens group includes at least one negative lens which has the anomalous dispersion property and which has 70 or more in Abbe number. At least one positive lens which has an anomalous dispersion property and which has 70 or more in Abbe number is included in the third to fifth lens groups which are movable groups. Furthermore, at least one of the negative lens having the anomalous dispersion property is cemented to a positive lens adjacent to the negative lens. At least one of the positive lens having the anomalous dispersion property is cemented to a negative lens adjacent to the positive lens.

Namely, the projection type zoom lens and the projection type display apparatus are configured so that of the lens groups which are movable during the variation of magnification, the positive lens which is located on the reduction side and which has a large Abbe number is provided with the anomalous dispersion property. Thereby, chromatic aberration is effectively alleviated, and variation of the point of focus associated with a temperature change, which occurs due to the positive lens having the anomalous dispersion property, is offset by the negative lens which is disposed in the first lens group fixed during the variation of magnification and which has the anomalous dispersion property and the large Abbe number. Also, if the power of the negative lens having the anomalous dispersion property is made excessively large, the occurrence of comatic aberration increases. Therefore, particularly by forming at least one of the negative lens as a cemented lens, the comatic aberration is reduced without the power of the negative lens being weakened. Additionally, the chromatic aberration is further reduced by forming at least one of the positive lens as a cemented lens.

Accordingly, even in cases where the temperature change is large and the relative positions of the respective lens groups change as in the projection type zoom lens for a projection type projector, by means of a simple configuration it becomes possible to satisfactorily compensate for the deviation of the point of focus associated with a temperature change while favorably reducing chromatic aberration and comatic aberration.

Furthermore, since the conditional expression (1) is satisfied, it is possible to sufficiently secure the back focus, and it is possible to insert an optical system such as a cross dichroic prism between the projection type zoom lens and a light valve.

BRIEF DESCRIPTION OF THE DRAWINGS

FIG. 4 is an aberration diagram illustrating various aberrations (spherical aberration, astigmatism, distortion and lateral chromatic aberration) of the projection type zoom lens of Example 1 at a wide-angle end and a telephoto end;

FIG. 7 is an aberration diagram illustrating various aberrations (spherical aberration, astigmatism, distortion and lateral chromatic aberration) of the projection type zoom lens of Example 2 at the wide-angle end and the telephoto end;

FIG. 10 is an aberration diagram illustrating various aberrations (spherical aberration, astigmatism, distortion and lateral chromatic aberration) of the projection type zoom lens of Example 3 at the wide-angle end and the telephoto end;

DETAILED DESCRIPTION OF EMBODIMENTS OF THE INVENTION

Figure 1:
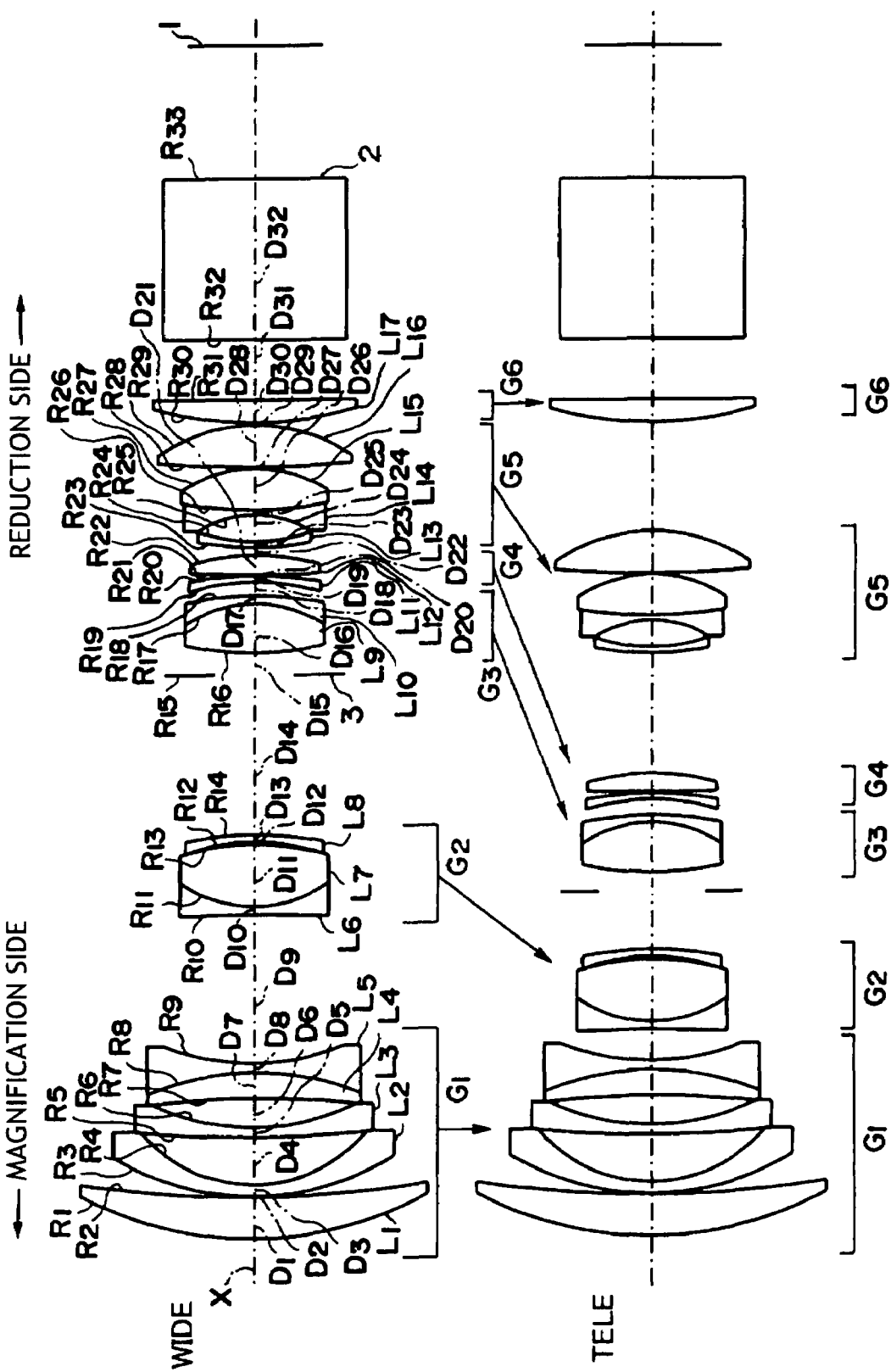
FIG. 1 is a schematic diagram illustrating the configuration of a projection type zoom lens according to Example 1 of the invention.

Referring now to the accompanying drawings, an embodiment of the invention will be described below. The projection type zoom lens of an embodiment shown in FIG. 1 (which shows Example 1 as a typical example) includes, in order from a magnification side, a first lens group $G_1$ having a negative refractive power and second to sixth lens group $G_2$ to $G_6$ having positive refractive powers. Disposed in subsequent stages thereof are a cross dichroic prism (filter portion) 2 and a display surface 1 of a light valve (a DMD or a liquid crystal display panel of a transmission type or a reflection type) (hereafter referred to as the display surface 1). Here, "X" in the drawing represents an optical axis.

In addition, a diaphragm 3 is disposed between the second lens group $G_2$ and the third lens group $G_3$. The reduction side is made substantially telecentric. It is noted that as for the mode of this diaphragm 3, various variations may be made, but it is preferable to adopt the so-called variable aperture in which the aperture diameter is made variable so as to become, for instance, large as zooming is performed from the wide-angle end to the telephoto end. As a result, it becomes possible to set the f-number to be substantially fixed in the entire zooming range. In addition, this diaphragm 3 is preferably moved along the optical axis, and its movement is preferably a movement integrated with the third lens group $G_3$.

However, the above description does not exclude that the diaphragm 3 is moved together with another lens group or moved independently of the lens groups.

Here, the first lens group $G_1$ includes, in order from the magnification side, a first lens $L_1$ having a positive meniscus lens with a convex surface directed to the magnification side; a second lens $L_2$ having a negative meniscus lens with a concave surface directed to the reduction side; a third lens $L_3$ having a negative meniscus lens with a concave surface directed to the reduction side; a fourth lens $L_4$ having a positive meniscus lens with a convex surface directed to the reduction side; and a fifth lens $L_5$ having a biconcave lens. It is noted that the fourth lens $L_4$ and the fifth lens $L_5$ are cemented to each other.

In addition, the second lens group $G_2$ includes, in order from the magnification side, a sixth lens $L_6$ having a negative lens with a concave surface directed to the reduction side; a seventh lens $L_7$ having a biconvex lens; and an eighth lens $L_8$ having a negative meniscus lens with a concave surface directed to the magnification side. It is noted that the sixth lens $L_6$ and the seventh lens $L_7$ are cemented to each other.

In addition, the third lens group $G_3$ includes a cemented lens in which a ninth lens $L_9$ having a biconvex lens and a tenth lens $L_{10}$ having a negative meniscus lens with a concave surface directed to the magnification side are arranged in order from the magnification side and are cemented together.

In addition, the fourth lens group $G_4$ includes, in order from the magnification side, an eleventh lens $L_{11}$ having a negative meniscus lens with a concave surface directed to the magnification side and a twelfth lens $L_{12}$ having a biconvex lens.

In addition, the fifth lens group $G_5$ includes, in order from the magnification side, a thirteenth lens $L_{13}$ having a negative meniscus lens with a concave surface directed to the reduction side; a fourteenth lens $L_{14}$ having a biconcave lens; a fifteenth lens $L_{15}$ having a biconvex; and a sixteenth lens $L_{16}$ having by a biconvex lens. It is noted that the fourteenth lens $L_{14}$ and the fifteenth lens $L_{15}$ are cemented to each other.

Further, the sixth lens group $G_6$ includes a seventeenth lens $L_{17}$ having a single positive lens.

It is noted that the lens configuration of the above-described lens groups is not limited thereto. One or more negative or positive lenses may be added or subtracted, or the cemented lens may be replaced by a single lens, or vice versa.

Since the projection type zoom lens of this embodiment is formed as a negative lead type zoom lens as described above, a wide angle is easy to attain, and a back focus of an appropriate length can be ensured.

In addition, the projection type zoom lens of this embodiment is configured to have a variable power function by moving the four lens groups, that is, the second to fifth lens group $G_2$ to $G_5$ during zooming. Namely, since the entire lens system is divided into the six groups, and the variable power function is apportioned to the respective groups so that the four lens groups are independently moved during zooming, it is possible to improve the optical performance and suppress variations of the f-number accompanying the zooming.

In addition, as is also apparent from movement loci of the lens groups in FIG. 1, the four lens groups, that is, the second to fifth lens group $G_2$ to $G_5$ are respectively configured to move toward the magnification side during zooming from the wide-angle end to the telephoto end.

Incidentally, in the projection type zoom lens of this embodiment, an anomalous dispersion glass material is used in some lenses in order to reduce chromatic aberration in response to the demand for higher resolution of display images in recent years. Namely, positive lenses (the ninth lens $L_9$ in Example 1, the twelfth lens $L_{12}$ in Example 2, and the fourteenth lens $L_{14}$ in Example 3) made of the anomalous dispersion glass material having 70 or more in Abbe number are disposed in lens groups on the reduction side among the movable groups during zooming, specifically among three lens groups, that is, the third to fifth lens group $G_3$ to $G_5$ located on the reduction side of the diaphragm 3 (defining the pupil position). Thereby, substantial reduction of chromatic aberration is attained.

However, the anomalous dispersion glass material is opposite in sign of a temperature coefficient of a refractive index to a normal glass material. Therefore, if the power of the positive lens is made stronger, the point of focus would deviate.

Accordingly, in the projection type zoom lens of this embodiment, a negative lens (the fifth lens $L_5$ in the respective Examples) made of the anomalous dispersion glass material having 70 or more in Abbe number is disposed in the first lens group $G_1$ which is fixed during zooming, for the purpose of offsetting the variation of the point of focus which are caused by the positive lenses and which are associated with a temperature change.

In addition, if the power of the negative lens having the anomalous dispersion property is made excessively large, the occurrence of comatic aberration increases. Therefore, particularly by forming this negative lens as a cemented lens in which it is cemented to an adjacent positive lens (the fourth lens $L_4$ in each Example), comatic aberration is reduced without the power of the negative lens being weakened. Additionally, chromatic aberration is further reduced by forming the positive lenses made of the anomalous dispersion glass material as a cemented lens.

Accordingly, in the projection type zoom lens of this embodiment, even in cases where the temperature change is large and the relative positions of the respective lens groups change, by means of a simple configuration it becomes possible to satisfactorily compensate for the deviation of the point of focus due to a temperature change while favorably reducing chromatic aberration and comatic aberration.

In addition, in the zoom lens of this embodiment, a plurality of negative lenses which have the anomalous dispersion property and which have 70 or more in Abbe number may be disposed in the first lens group $G_1$. Also, a plurality of positive lenses which have the anomalous dispersion property and which have 70 or more in Abbe number may be disposed in the third to fifth lens group $G_3$ to $G_5$. However, in this case as well, the requirement is that at least one of the negative lenses having the anomalous dispersion property is cemented to a positive lens adjacent to that negative lens, and that at least one of the positive lenses having the anomalous dispersion property is cemented to a negative lens adjacent to that positive lens.

It is noted that the "anomalous dispersion property" referred to herein means a property that a glass material concerned is distant from a straight line (reference line) connecting F2 and K7 selected as two standard glass types considered to exhibit normal distributions in a known partial dispersion ratio distribution diagram in which each glass material is plotted in a coordinate system by taking a partial dispersion ratio ($\theta g, F$) as the ordinate and the Abbe number (vd) as the abscissa.

Accordingly, in the invention, a glass material which is plotted at a position distant from the reference line is used as the lens having the anomalous dispersion property. Preferably, a lens material may be used which falls within a range where the partial dispersion ratio ($\theta g, F$) is not less than 0.52 and not more than 0.54 in the partial dispersion ratio distribution diagram and the Abbe number is not less than 70.

In addition, the projection type zoom lens of this embodiment is configured so as to satisfy the following conditional expressions (1) to (3):

$$bf/fw \geq 2.7 \quad (1)$$

$$3.0 \leq fw_{G12}/fw \leq 6.0 \quad (2)$$

$$1.3 \leq d_{G23}/fw \leq 2.0 \quad (3)$$

where bf denotes a back focus,
  fw denotes the focal length of the entire system at the wide-angle end
  $fw_{G12}$ denotes the combined focal length of the first lens group and the second lens group at the wide-angle end
  $d_{G23}$ denotes an interval between the second lens group and the third lens group at the wide-angle end Here, the technical significance of the conditional expressions (1) to (4) will be described.

The conditional expression (1) regulates the magnitude of the back focus. If bf/fw falls below the lower limit of the conditional expression (1), it becomes difficult for an optical member such as a cross dichroic prism to be inserted between this zoom lens and a light valve.

In addition, the conditional expression (2) regulates a ratio of the combined focal length of the first lens group G1 and the second lens group $G_2$ at the wide-angle end to the focal length of the entire system at the wide-angle end. If $fw_{G12}/fw$ exceeds the upper limit of the conditional expression (2), it becomes difficult to obtain a sufficient back focus. If an attempt is made to lengthen the back focus unduly, it results in an increase in the number of lenses and in a large size of the apparatus.

On the other hand, if $fw_{G12}/fw$ falls below the lower limit of the conditional expression (2), it becomes difficult to correct the aberrations occurring in the first and second lens groups $G_1$ and $G_2$ by the lens groups $G_3$ to $G_6$ located closer to the reduction side than the lens groups $G_1$ and $G_2$.

In addition, the conditional expression (3) regulates a ratio of the interval between the second lens group $G_2$ and the third lens group $G_3$ at the wide-angle end to the focal length of the entire system at the wide-angle end. If $d_{G23}/fw$ exceeds the upper limit of the conditional expression (3), it results in a large size of the apparatus. On the other hand, if $d_{G23}/fw$ falls below the lower limit of the conditional expression (3), comatic aberration increases. If the zoom ratio becomes further greater, the second lens group $G_2$ and the third lens group $G_3$ interfere with each other at the telephoto end, so that it becomes difficult to obtain a zoom ratio of 1.8 or more.

Furthermore, in the case where a negative lens having the anomalous dispersion property is provided in the first lens group $G_1$ and a positive lens having the anomalous dispersion property is provided in the third lens group $G_3$ to the fifth lens group $G_5$, the following conditional expression is preferably satisfied:

$$0.5 \leq |f\text{-convex}/f\text{-concave}| \leq 1.0 \quad (4)$$

where f-concave denotes the focal length of this negative lens, and
  f-convex denotes the focal length of this positive lens.

By satisfying this conditional expression (4), it is possible to provide an appropriate power balance between the negative lens having the anomalous dispersion property and the positive lens having the anomalous dispersion property, and it becomes possible to satisfactorily compensate for the deviation of the point of focus due to a temperature change while favorably reducing chromatic aberration and comatic aberration.

Figure 13:
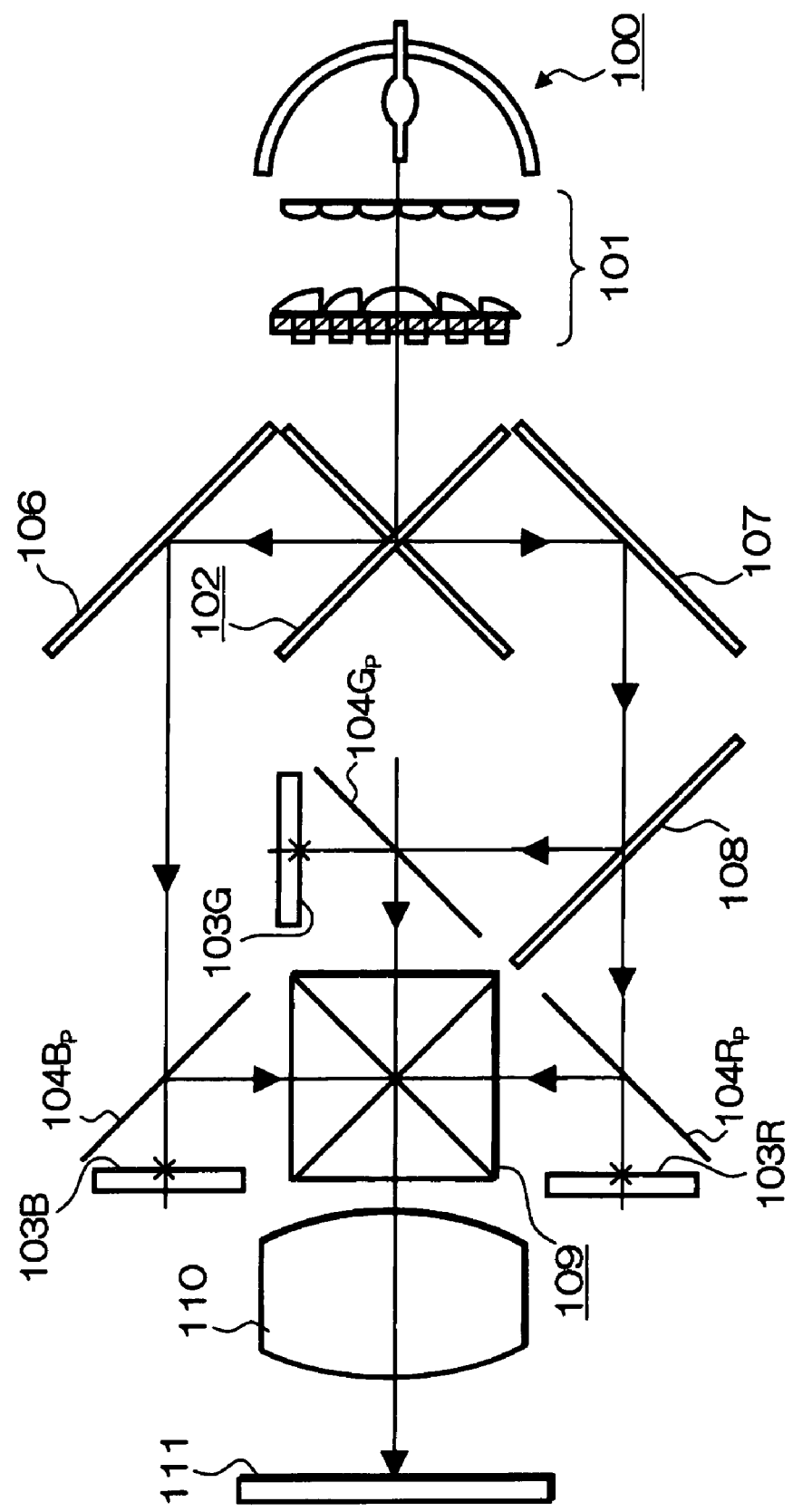
FIG. 13 is a schematic diagram of a projection type display apparatus according to an embodiment.

Next, a projection type display apparatus according to an embodiment of the invention will be described briefly. FIG. 13 is a schematic diagram of the projection type display apparatus of this embodiment.

As shown in FIG. 13, by means of an illuminating optical system (including a fly's-eye lens and a comb type filter) 101, a beam of light emitted from a light source 100 is subjected to uniformalization of the light amount distribution in a cross section perpendicular to the optical axis of the light beam and is converted to polarized light with its polarization direction made uniform. The light beam is then separated into the respective color light of the three primary color light (R, G, B) by a color separating optical system 102, and is radiated to LOCOS (liquid crystal on silicon of a reflection type) display surfaces 103R, 103G, and 103B corresponding to the respective color light. On these display surfaces 103R, 103G, and 103B, the respective color light is subjected to various modulations by corresponding video signals. Subsequently, the respective color light reflected from the display surfaces 103R, 103G, and 103B is synthesized by a cross dichroic prism 109 and is made incident upon a projection type zoom lens, allowing video information carried by the respective color light to be projected onto a screen 111. It is noted that, as shown in the drawing, wire grid polarizing plates $104R_P$, $104R_G$, and $104R_B$ are disposed in correspondence with the respective display surfaces 103R, 103G, and 103B with respect to the respective color light incident upon the display surfaces 103R, 103G, and 103B, in order to polarize the traveling direction of the respective color light emergent from the display surfaces 103R, 103G, and 103B. In this type of projection type display apparatus, an extra space is required for disposing the LCOS and the wire grid polarizing plates $104R_P$, $104R_G$, and $104R_B$, and it is necessary to secure a longer back focus than in a normal projection type display apparatus.

It is noted that the projection type display apparatus shown in FIG. 13 illustrates an embodiment of the invention, and various modifications are possible. For instance, instead of the LCOS (reflection type liquid crystal), it is possible to use other light valves such as a transmission type liquid crystal or a DMD. In addition, it is also possible to make a change so as to perform the color sequence operation by using a single-plate light valve.

EXAMPLES

Hereafter, the projection type zoom lens according to the embodiments of the invention will be further described with reference to specific examples.

Example 1

A schematic configuration of the projection type zoom lens according to Example 1 is shown in FIG. 1. This projection type zoom lens includes, in order from the magnification side, the first lens group $G_1$ having a negative refractive power and the second to sixth lens group $G_2$ to $G_6$ having positive refractive power.

Since the description of the lens configuration of each group in Example 1 has been given in the description of the embodiment, a redundant description will be omitted. It is noted that the ninth lens $L_9$ of the third lens group $G_3$ is set as a positive lens made of the anomalous dispersion glass material having 70 or more in Abbe number.

Values of the radius of curvature R (unit: mm) of each lens surface of this projection type zoom lens, the central thickness of each lens and air spacing between the lenses (hereafter, these will be collectively referred to as an axial surface distance) D (unit: mm), and a refractive index N and the Abbe number at the d-line of each lens are shown in Table 1. It is noted that each number in the table indicates the sequence from the magnification side (the same applies to Tables 2 and 3).

It is noted that each lens group interval and the aperture diameter of the variable diaphragm 3 in the case where the focal length of the entire system is 21.25 mm (wide-angle end) and 42.49 mm (telephoto end) are shown on the left side of the lower part of Table 1.

TABLE 1

| | Surface | R | D | $N_d$ | $\nu_d$ |
|---|---|---|---|---|---|
| | 1 | 74.87 | 8.18 | 1.71300 | 53.9 |
| | 2 | 226.84 | 0.20 | | |
| | 3 | 54.94 | 2.30 | 1.67790 | 55.3 |
| | 4 | 30.07 | 9.35 | | |
| | 5 | 253.90 | 1.95 | 1.80518 | 25.4 |
| | 6 | 48.01 | 5.78 | | |
| | 7 | −180.60 | 5.19 | 1.77250 | 49.6 |
| | 8 | −56.14 | 1.80 | 1.49700 | 81.6 |
| | 9 | 49.00 | GUN(1) | | |
| | 10 | −368.01 | 1.60 | 1.71300 | 53.9 |
| | 11 | 26.15 | 12.20 | 1.72047 | 34.7 |
| | 12 | −53.42 | 0.60 | | |
| | 13 | −39.80 | 1.40 | 1.51742 | 52.4 |
| | 14 | −72.37 | GUN(2) | | |
| Variable | 15 | ∞ | 4.00 | | |
| diaphragm | 16 | 63.85 | 9.81 | 1.49700 | 81.6 |
| | 17 | −25.64 | 1.50 | 1.51633 | 64.1 |
| | 18 | −70.18 | GUN(3) | | |
| | 19 | −46.73 | 1.20 | 1.83400 | 37.2 |
| | 20 | −79.18 | 0.20 | | |
| | 21 | 273.76 | 3.79 | 1.48749 | 70.2 |
| | 22 | −49.01 | GUN(4) | | |
| | 23 | 58.83 | 1.20 | 1.80518 | 25.4 |
| | 24 | 34.10 | 5.29 | | |
| | 25 | −21.47 | 1.00 | 1.83481 | 42.7 |
| | 26 | 87.30 | 8.14 | 1.51633 | 64.1 |
| | 27 | −27.01 | 0.20 | | |
| | 28 | 245.42 | 8.29 | 1.58913 | 61.2 |
| | 29 | −34.68 | GUN(5) | | |
| | 30 | 75.91 | 4.43 | 1.58913 | 61.2 |
| | 31 | ∞ | 12.00 | | |
| | 32 | ∞ | 31.70 | 1.51633 | 64.1 |
| | 33 | ∞ | | | |

| | Group distance | WIDE | TELE | | |
|---|---|---|---|---|---|
| | GUN(1) | 28.51 | 5.71 | bf/fw ≧ 2.7: | 2.81 |
| | GUN(2) | 32.17 | 11.21 | 1.3 ≦ d2 ≦ 2.0: | 1.70 |
| | GUN(3) | 2.80 | 3.10 | 2.0 ≦ fw1/fw ≦ 6.0: | 4.49 |
| | GUN(4) | 1.50 | 23.98 | 0.5 ≦ f♁/f♃ ≦ 1.0: | 0.730 |
| | GUN(5) | 0.50 | 21.49 | | |
| Variable diameter | diaphragm | φ16.96 | φ22.91 | | |

In addition, according to the projection type zoom lens of Example 1, the zoom ratio is set to 2.0, and all the conditional expressions (1) to (4) are satisfied as shown on the rightmost side in the lower part of Table 1.

In addition, FIG. 4 is an aberration diagram illustrating the spherical aberration, astigmatism, distortion, and lateral chromatic aberration at the wide-angle end (WIDE, hereafter the same) and the telephoto end (TELE, hereafter the same) of the projection type zoom lens of Example 1. It is noted that the astigmatism diagram shows aberrations in the sagittal image plane and the tangential image plane (the same applies to FIGS. 7 and 10).

Figure 5:
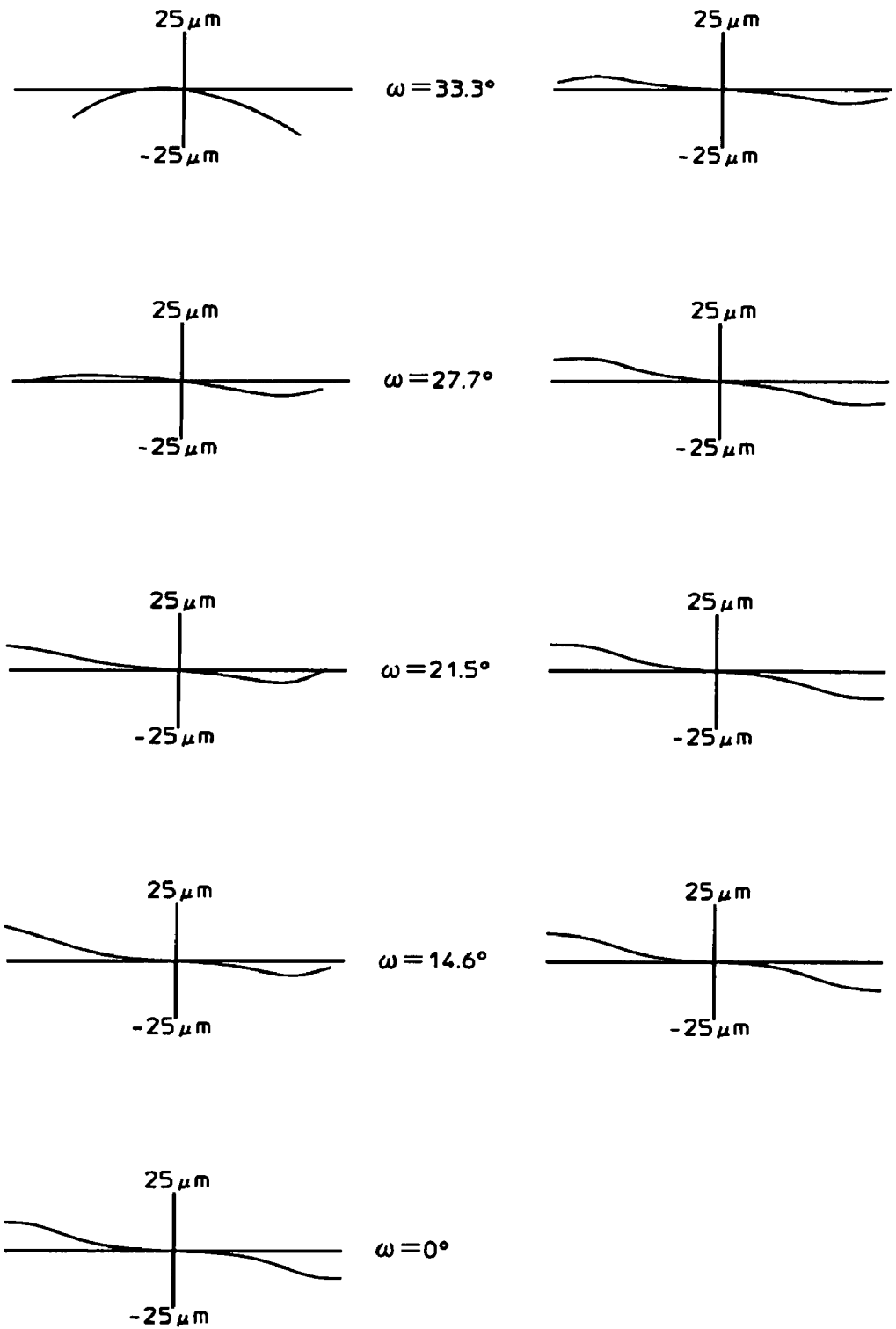
FIG. 5 is an aberration diagram illustrating comatic aberration of the projection type zoom lens of Example 1 at the wide-angle end.
Figure 6:
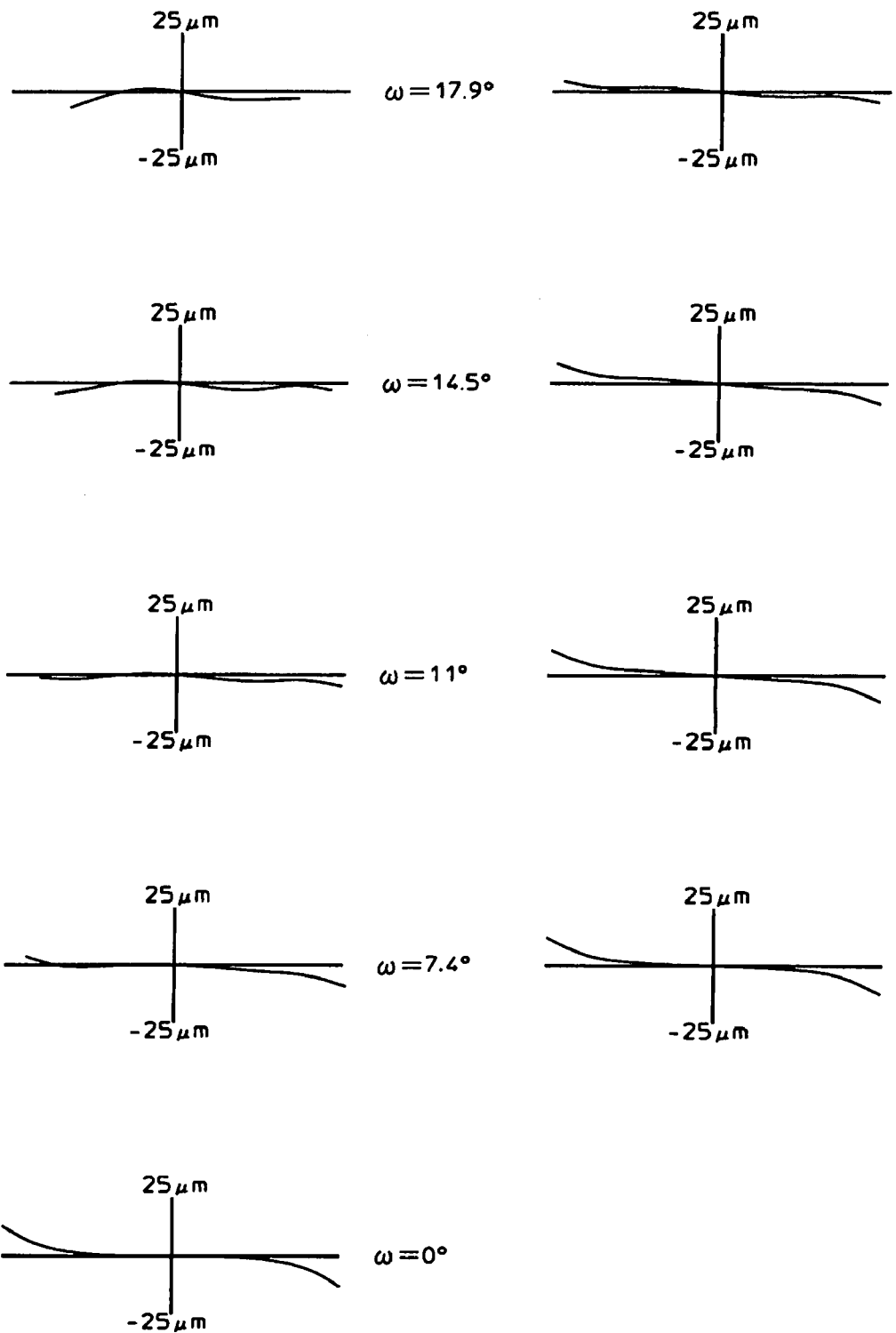
FIG. 6 is an aberration diagram illustrating comatic aberration of the projection type zoom lens of Example 1 at the telephoto end.

In addition, FIG. 5 is an aberration diagram illustrating comatic aberration at the wide-angle end of the projection type zoom lens of Example 1. FIG. 6 is an aberration diagram illustrating comatic aberration at the telephoto end of the projection type zoom lens of Example 1.

As is apparent from these aberration diagrams, according to the projection type zoom lens of Example 1, it is possible to very satisfactorily correct the aberrations, particularly the lateral chromatic aberration and comatic aberration. It is noted that in Example 1, distortion is a satisfactory value of 2% or less, which permits satisfactory use as a projection type zoom lens.

Namely, according to the projection type zoom lens of Example 1, the optical performance can be made satisfactory while securing a large back focus and a high zoom ratio.

Example 2

Figure 2:
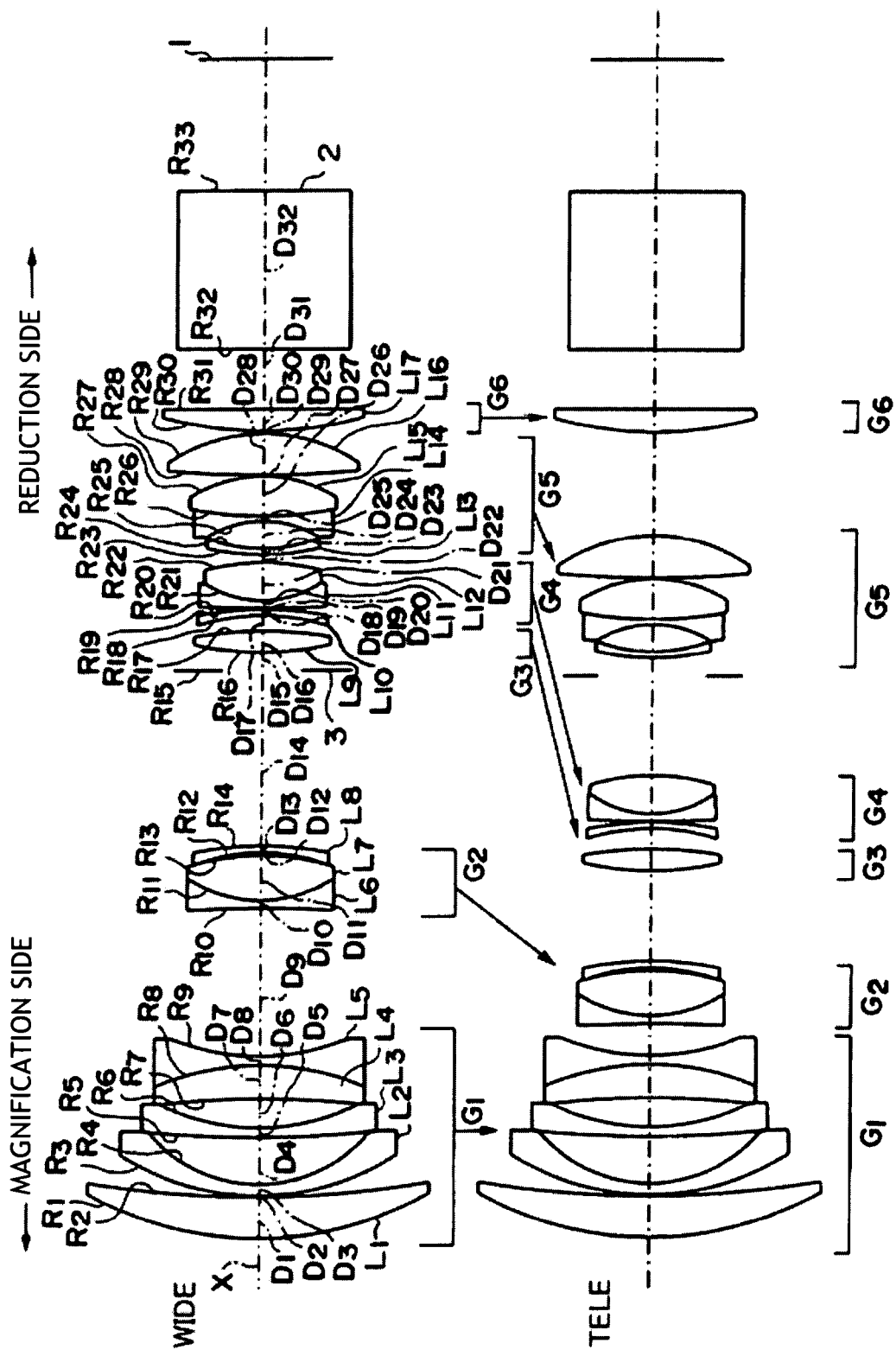
FIG. 2 is a schematic diagram illustrating the configuration of a projection type zoom lens according to Example 2 of the invention.

A schematic configuration of the projection type zoom lens according to Example 2 is shown in FIG. 2. In this Example, a description which is a duplicate of the description on Example 1 will be omitted.

The lens configuration of the projection type zoom lens according to Example 2 is substantially similar to that of Example 1, but differs mainly in the configurations of the third lens group $G_3$ and the fourth lens group $G_4$. Namely, the third lens group $G_3$ is includes a single ninth lens $L_9$ formed of a biconvex lens. In addition, the fourth lens group $G_4$ includes, in order from the magnification side, the tenth lens $L_{10}$ formed of a negative meniscus lens with the concave surface directed to the magnification side, the eleventh lens $L_{11}$ formed of a negative meniscus lens with the concave surface directed to the reduction side, and the twelfth lens $L_{12}$ formed of a biconvex lens. The eleventh lens $L_{11}$ and the twelfth lens $L_{12}$ are cemented to each other. In addition, the twelfth lens $L_{12}$ of the fourth lens group $G_4$ is set as a positive lens made of the anomalous dispersion glass material having 70 or more in Abbe number.

Values of the radius of curvature R (unit: mm) of each lens surface of this projection type zoom lens, the axial surface distance D (unit: mm) of each lens, and the refractive index N and the Abbe number at the d-line of each lens are shown in Table 2.

It is noted that each lens group interval and the aperture diameter of the variable diaphragm 3 in the case where the focal length of the entire system is 21.24 mm (wide-angle end) and 42.49 mm (telephoto end) are shown on the left side of the lower part of Table 2.

TABLE 2

| | Surface | R | D | $N_d$ | $\nu_d$ |
|---|---|---|---|---|---|
| | 1 | 73.29 | 8.24 | 1.71300 | 53.9 |
| | 2 | 213.03 | 0.20 | | |
| | 3 | 52.85 | 2.30 | 1.67790 | 55.3 |
| | 4 | 29.73 | 9.43 | | |
| | 5 | 241.39 | 1.95 | 1.80518 | 25.4 |
| | 6 | 45.71 | 5.94 | | |
| | 7 | −182.30 | 6.67 | 1.77250 | 49.6 |
| | 8 | −55.98 | 1.80 | 1.49700 | 81.6 |
| | 9 | 48.14 | GUN(1) | | |
| | 10 | −279.63 | 1.60 | 1.71300 | 53.9 |
| | 11 | 27.76 | 9.10 | 1.72047 | 34.7 |
| | 12 | −51.18 | 0.53 | | |
| | 13 | −39.78 | 1.40 | 1.51742 | 52.4 |
| | 14 | −70.16 | GUN(2) | | |
| Variable | 15 | ∞ | 4.00 | | |
| diaphragm | 16 | 61.92 | 4.32 | 1.51633 | 64.1 |
| | 17 | −88.72 | GUN(3) | | |

TABLE 2-continued

| | | | | |
|---|---|---|---|---|
| 18 | −44.68 | 1.20 | 1.83400 | 37.2 |
| 19 | −72.79 | 0.20 | | |
| 20 | 273.97 | 1.50 | 1.51633 | 64.1 |
| 21 | 22.13 | 7.66 | 1.49700 | 81.6 |
| 22 | −45.12 | GUN(4) | | |
| 23 | 52.88 | 1.20 | 1.80518 | 25.4 |
| 24 | 32.18 | 5.51 | | |
| 25 | −22.19 | 1.00 | 1.83481 | 42.7 |
| 26 | 80.31 | 8.06 | 1.51633 | 64.1 |
| 27 | −28.75 | 0.20 | | |
| 28 | 216.57 | 8.48 | 1.58913 | 61.2 |
| 29 | −34.85 | GUN(5) | | |
| 30 | 76.11 | 4.47 | 1.58913 | 61.2 |
| 31 | ∞ | 12.00 | | |
| 32 | ∞ | 31.70 | 1.51633 | 64.1 |
| 33 | ∞ | | | |

| | Group distance | WIDE | TELE | | |
|---|---|---|---|---|---|
| | GUN(1) | 28.99 | 5.98 | bf/fw ≥ 2.7: | 2.81 |
| | GUN(2) | 34.81 | 14.17 | 1.3 ≤ d2 ≤ 2.0: | 1.83 |
| | GUN(3) | 3.16 | 4.19 | 2.0 ≤ fw1/fw ≤ 6.0: | 3.67 |
| | GUN(4) | 1.50 | 23.75 | 0.5 ≤ f⌒/f凹 ≤ 1.0: | 0.598 |
| | GUN(5) | 0.50 | 20.87 | | |
| Variable diameter | diaphragm | φ17.26 | φ23.50 | | |

According to the projection type zoom lens of Example 2, the zoom ratio is set to 2.0, and all the conditional expressions (1) to (4) are satisfied as shown on the rightmost side in the lower part of Table 2.

In addition, FIG. 7 is an aberration diagram illustrating the spherical aberration, astigmatism, distortion, and lateral chromatic aberration at the wide-angle end and the telephoto end of the projection type zoom lens of Example 2.

Figure 8:
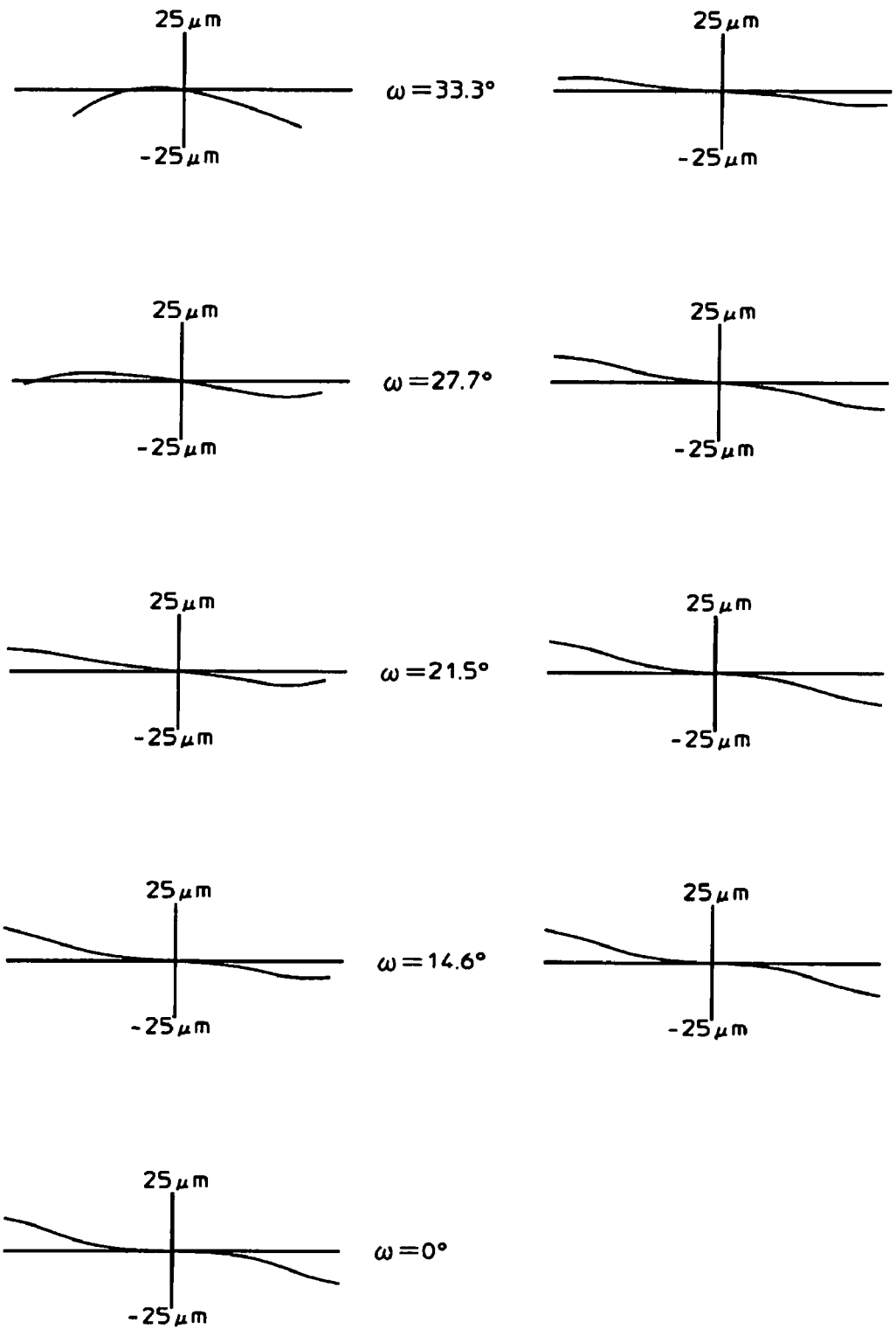
FIG. 8 is an aberration diagram illustrating comatic aberration of the projection type zoom lens of Example 2 at the wide-angle end.
Figure 9:
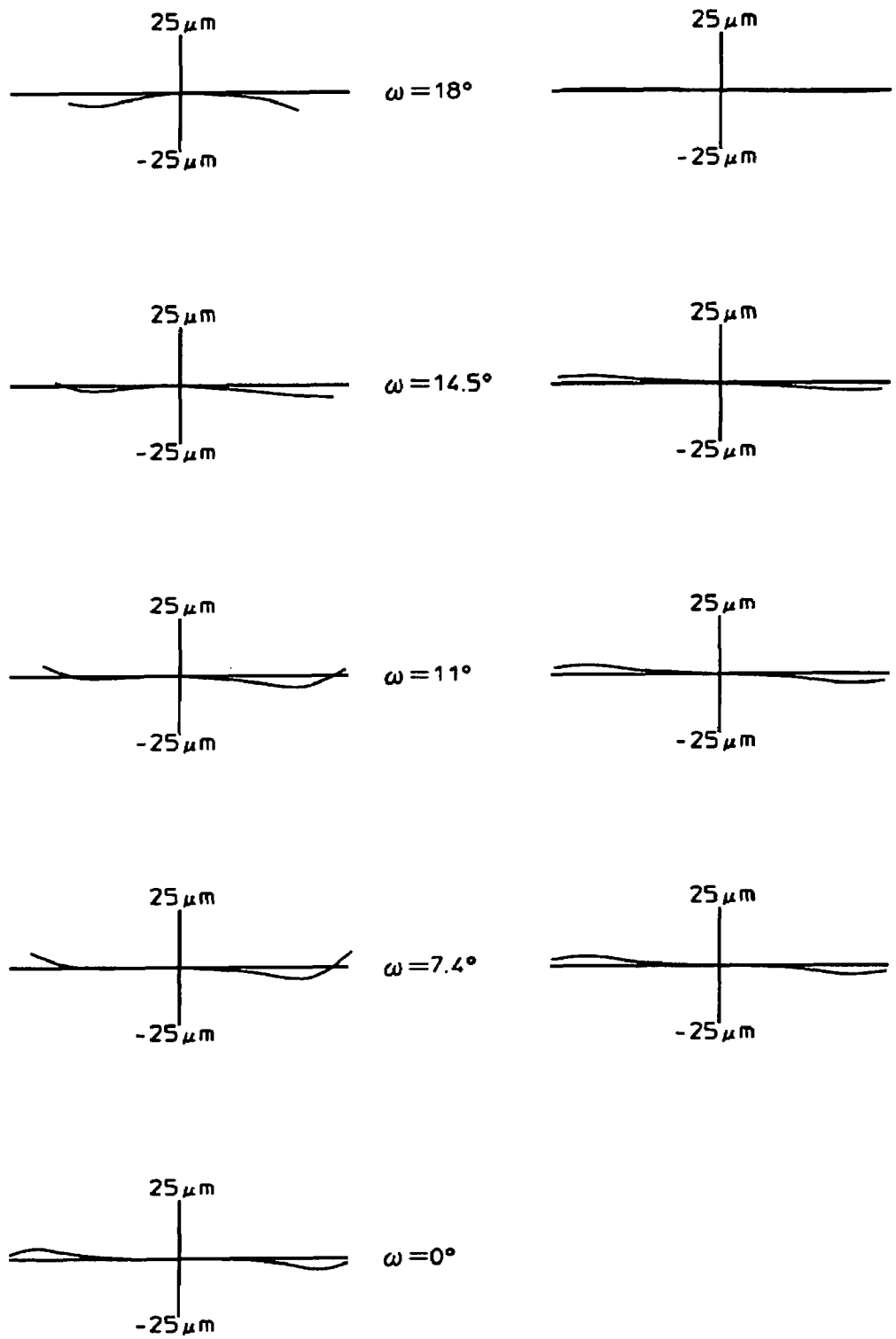
FIG. 9 is an aberration diagram illustrating comatic aberration of the projection type zoom lens of Example 2 at the telephoto end.

In addition, FIG. 8 is an aberration diagram illustrating comatic aberration at the wide-angle end of the projection type zoom lens of Example 2. FIG. 9 is an aberration diagram illustrating comatic aberration at the telephoto end of the projection type zoom lens of Example 2.

As is apparent from these aberration diagrams, according to the projection type zoom lens of Example 2, it is possible to very satisfactorily correct the aberrations, particularly the lateral chromatic aberration and coma. It is noted that in Example 2, distortion is a satisfactory value of 2% or less, which permits satisfactory use as a projection type zoom lens.

Namely, according to the projection type zoom lens of Example 2, the optical performance can be made satisfactory while securing a large back focus and a high zoom ratio.

Example 3

Figure 3:
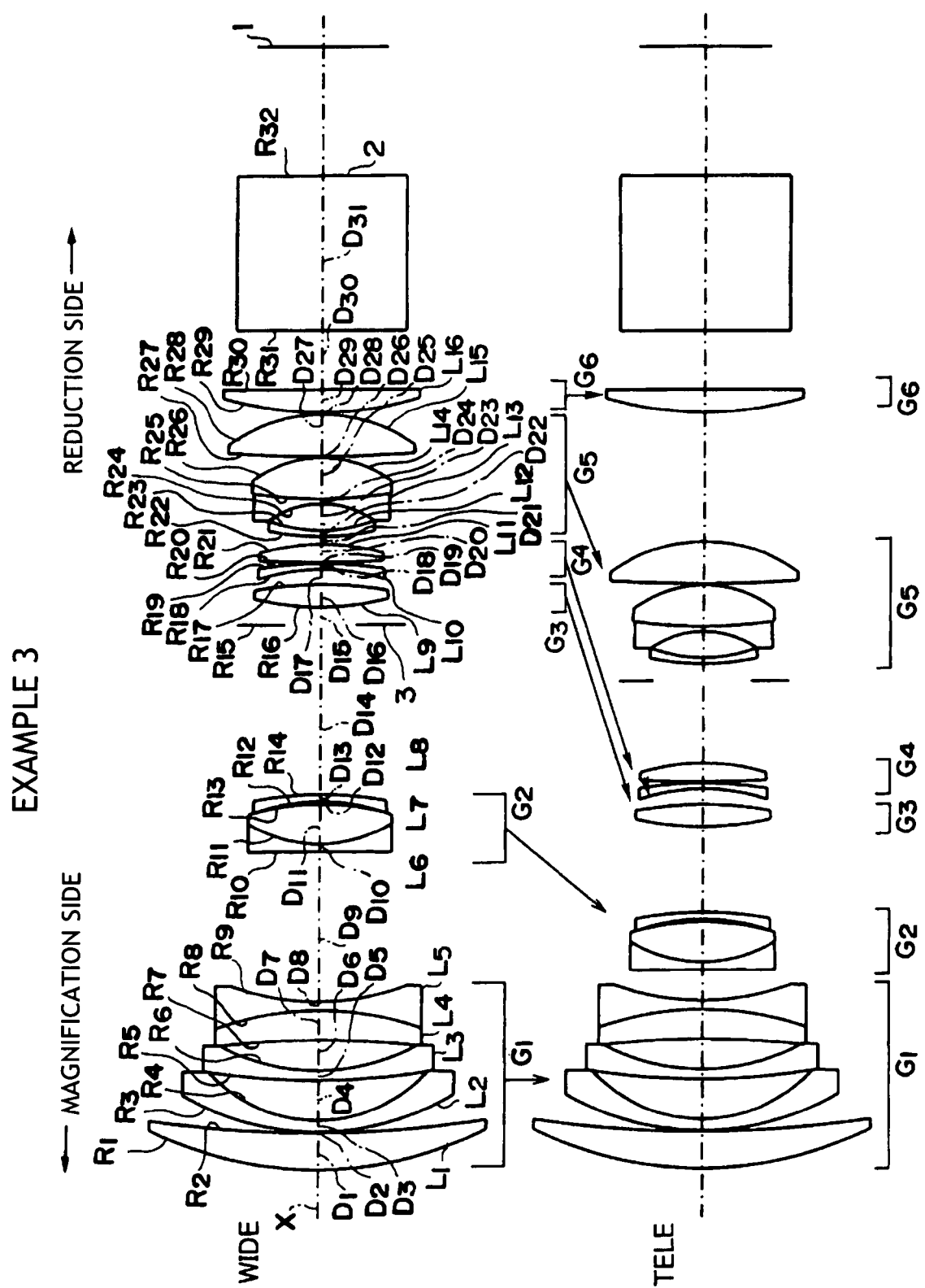
FIG. 3 is a schematic diagram illustrating the configuration of a projection type zoom lens according to Example 3 of the invention.

A schematic configuration of the projection type zoom lens according to Example 3 is shown in FIG. 3. In this Example, description which is a duplicate of the description on Example 2 will be omitted.

The lens configuration of the projection type zoom lens according to Example 3 is substantially similar to that of Example 2, but differs mainly in the configurations of the fourth lens group $G_4$ and the fifth lens group $G_5$. Namely, the fourth lens group $G_4$ differs from that of Example 2 in that the fourth lens group $G_4$ includes, in order from the magnification side, the tenth lens $L_{10}$ formed of a negative meniscus lens with the concave surface directed to the magnification side and the eleventh lens $L_{11}$ formed a biconvex lens. In addition, the construction differs from that of Example 2 in that the positive lens made of the anomalous dispersion glass material having 70 or more in Abbe number is set as the fourteenth lens $L_{14}$ of the fifth lens group $G_5$. In this Example, since the positive lens made of the anomalous dispersion glass material is provided in the fifth lens group $G_5$ where the cemented lens t is provided in the light of other requirement, as compared with the case where the positive lens made of the anomalous dispersion glass material is provided in another lens group, it becomes possible to reduce the number of lenses as a whole, and it is therefore preferable.

Values of the radius of curvature R (unit: mm) of each lens surface of this projection type zoom lens, the axial surface distance D (unit: mm) of each lens, and the refractive index N and the Abbe number at the d-line of each lens are shown in Table 3.

It is noted that each lens group interval and the aperture diameter of the variable diaphragm 3 in the case where the focal length of the entire system is 21.29 mm (wide-angle end) and 42.57 mm (telephoto end) are shown on the left side of the lower part of Table 3.

TABLE 3

| | Surface | R | D | $N_d$ | $v_d$ |
|---|---|---|---|---|---|
| | 1 | 80.46 | 7.40 | 1.71300 | 53.9 |
| | 2 | 241.21 | 0.20 | | |
| | 3 | 57.14 | 2.30 | 1.67790 | 55.3 |
| | 4 | 31.26 | 8.17 | | |
| | 5 | 150.38 | 1.95 | 1.80518 | 25.4 |
| | 6 | 43.69 | 6.29 | | |
| | 7 | −181.24 | 6.11 | 1.77250 | 49.6 |
| | 8 | −65.35 | 1.80 | 1.49700 | 81.6 |
| | 9 | 52.48 | GUN(1) | | |
| | 10 | −1007.98 | 1.60 | 1.71300 | 53.9 |
| | 11 | 29.16 | 8.13 | 1.72047 | 34.7 |
| | 12 | −53.65 | 0.52 | | |
| | 13 | −42.21 | 1.40 | 1.51742 | 52.4 |
| | 14 | −78.33 | GUN(2) | | |
| Variable diaphragm | 15 | ∞ | 4.00 | | |
| | 16 | 60.41 | 4.48 | 1.51633 | 64.1 |
| | 17 | −83.73 | GUN(3) | | |
| | 18 | −44.43 | 1.20 | 1.83400 | 37.2 |
| | 19 | −79.90 | 0.20 | | |
| | 20 | 237.87 | 3.79 | 1.48749 | 70.2 |
| | 21 | −46.44 | GUN(4) | | |
| | 22 | 56.25 | 1.20 | 1.80518 | 25.4 |
| | 23 | 31.30 | 5.38 | | |
| | 24 | −19.80 | 1.00 | 1.83481 | 42.7 |
| | 25 | 98.01 | 8.49 | 1.49700 | 81.6 |
| | 26 | −24.52 | 0.20 | | |
| | 27 | 277.62 | 8.69 | 1.58913 | 61.2 |
| | 28 | −33.35 | GUN(5) | | |
| | 29 | 73.538 | 4.66 | 1.58913 | 61.2 |
| | 30 | ∞ | 12.00 | | |
| | 31 | ∞ | 31.70 | 1.51633 | 64.1 |
| | 32 | ∞ | | | |

| | Group distance | WIDE | TELE | | |
|---|---|---|---|---|---|
| | GUN(1) | 29.92 | 5.88 | bf/fw ≥ 2.7: | 2.80 |
| | GUN(2) | 34.66 | 13.61 | 1.3 ≤ d2 ≤ 2.0: | 1.64 |
| | GUN(3) | 3.10 | 3.14 | 2.0 ≤ fw1/fw ≤ 6.0: | 4.49 |
| | GUN(4) | 1.51 | 20.66 | 0.5 ≤ f⌒/f凹 ≤ 1.0: | 0.693 |
| | GUN(5) | 0.47 | 26.37 | | |
| Variable diameter | diaphragm | φ16.48 | φ22.56 | | |

According to the projection type zoom lens of Example 3, the zoom ratio is set to 2.0, and all the conditional expressions (1) to (4) are satisfied as shown on the rightmost side in the lower part of Table 3.

In addition, FIG. 10 is an aberration diagram illustrating the spherical aberration, astigmatism, distortion, and lateral chromatic aberration at the wide-angle end and the telephoto end of the projection type zoom lens of Example 3.

Figure 11:
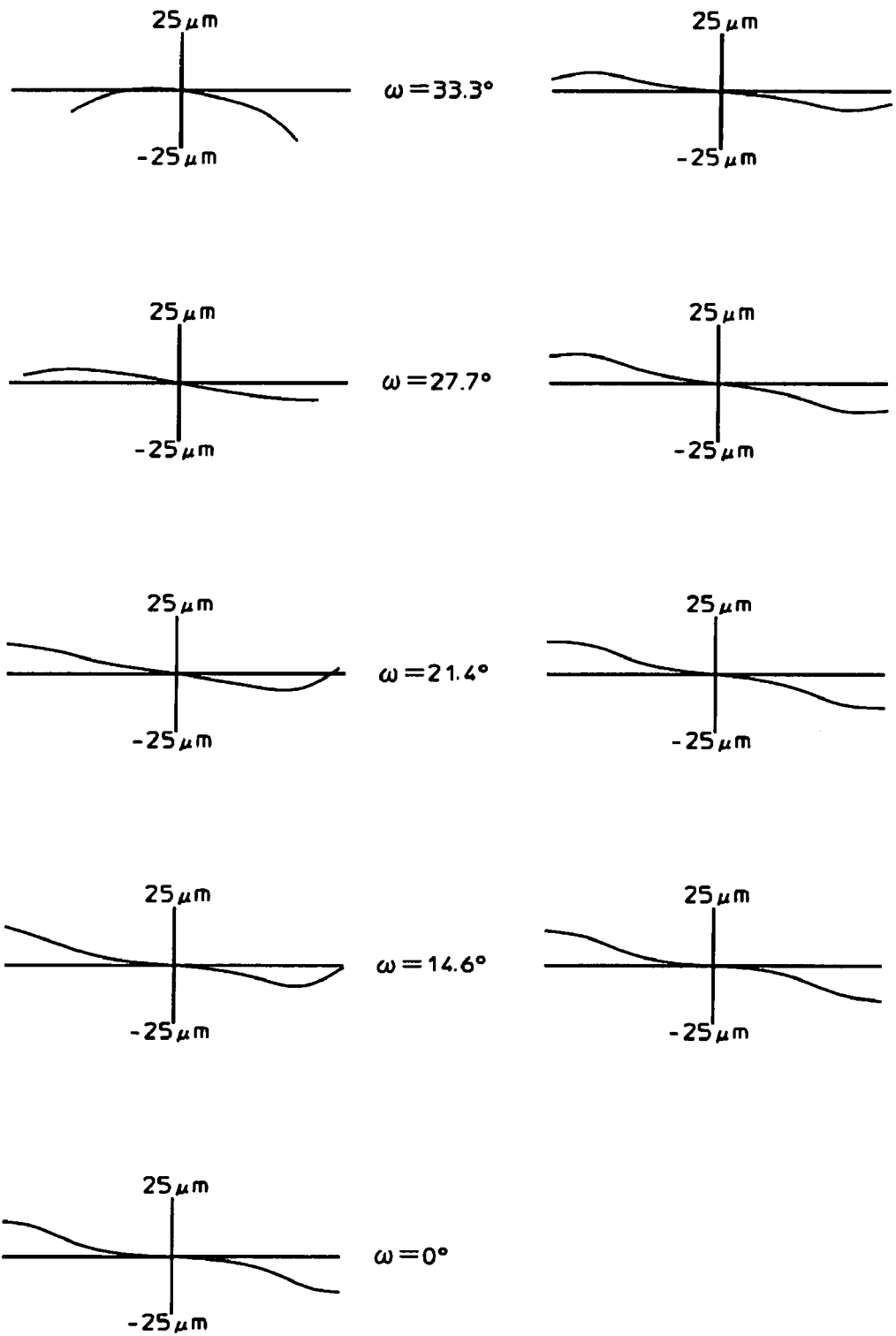
FIG. 11 is an aberration diagram illustrating comatic aberration of the projection type zoom lens of Example 3 at the wide-angle end.
Figure 12:
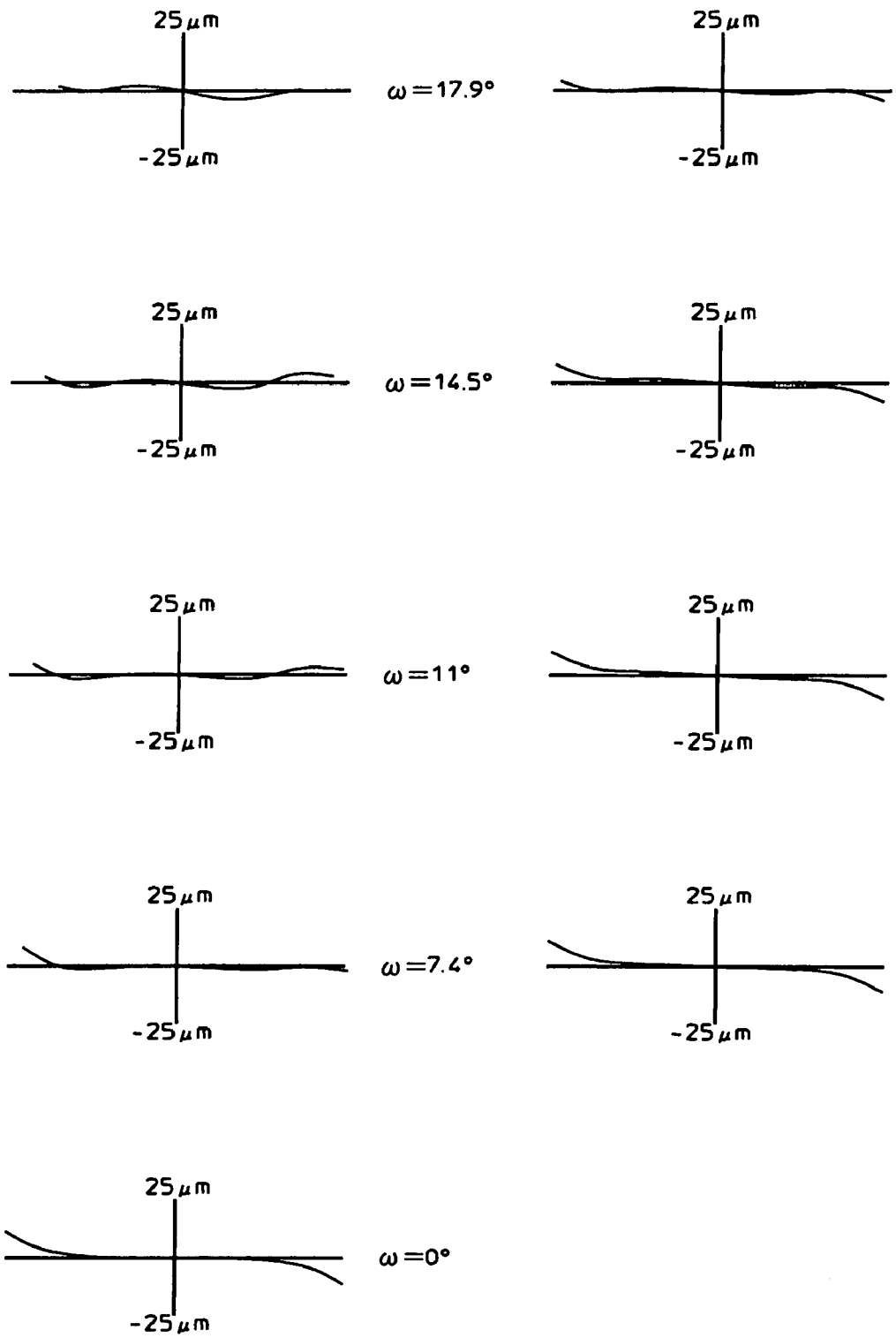
FIG. 12 is an aberration diagram illustrating comatic aberration of the projection type zoom lens of Example 3 at the telephoto end.

In addition, FIG. 11 is an aberration diagram illustrating comatic aberration at the wide-angle end of the projection type zoom lens of Example 3. FIG. 12 is an aberration diagram illustrating comatic aberration at the telephoto end of the projection type zoom lens of Example 3.

As is apparent from these aberration diagrams, according to the projection type zoom lens of Example 3, it is possible to very satisfactorily correct the aberrations, particularly the lateral chromatic aberration and coma. It is noted that, in Example 3, distortion is a satisfactory value of 2% or less, permitting satisfactory use as a projection type zoom lens.

Namely, according to the projection type zoom lens of Example 3, the optical performance can be made satisfactory while securing a large back focus and a high zoom ratio.

What is claimed is:

1. A projection type zoom lens comprising:
   a first lens group having a negative refractive power; and
   second to sixth lens groups having positive refractive powers, wherein:
   the first to sixth lens groups are arranged in order from a magnification side,
   the first lens group comprises at least one negative lens which has an anomalous dispersion property and which has 70 or more in Abbe number,
   at least one positive lens is included in the third to fifth lens group, the at least one positive lens which has an anomalous dispersion property and which has 70 or more in Abbe number,
   at least one of the negative lens having the anomalous dispersion property is cemented to a positive lens adjacent to the negative lens,
   at least one of the positive lens having the anomalous dispersion property is cemented to a negative lens adjacent to the positive lens,
   during variation of magnification, the second to fifth lens groups move and the first and sixth lens groups are fixed,
   during focus adjustment, the first lens group moves, and the following conditional expression (1) is satisfied:

$$bf/fw \geqq 2.7 \quad (1)$$

where bf denotes a back focus, and
   fw denotes a focal length of the entire system at a wide-angle end.

2. The projection type zoom lens according to claim 1, wherein the following conditional expressions (2) and (3) are satisfied:

$$3.0 \leqq fw_{G12}/fw \leqq 6.0 \quad (2)$$

$$1.3 \leqq d_{G23}/fw \leqq 2.0 \quad (3)$$

where $fw_{G12}$ denotes a combined focal length of the first and second lens groups at the wide-angle end, and $d_{G23}$ denotes an interval between the second and third lens groups at the wide-angle end.

3. The projection type zoom lens according to claim 1, wherein a diaphragm whose aperture diameter that varies in accordance with a magnification variation operation is disposed between the second lens group and the third lens group.

4. The projection type zoom lens according to claim 2, wherein a diaphragm whose aperture diameter varies in accordance with a magnification variation operation is disposed between the second lens group and the third lens group.

5. The projection type zoom lens according to claim 1, wherein a magnification ratio is set to 1.8 or more.

6. The projection type zoom lens according to claim 2, wherein a magnification ratio is set to 1.8 or more.

7. The projection type zoom lens according to claim 3, wherein a magnification ratio is set to 1.8 or more.

8. The projection type zoom lens according to claim 4, wherein a magnification ratio is set to 1.8 or more.

9. A projection type display apparatus comprising:
   a light source;
   a light valve;
   an illuminating optical system guiding a light beam from the light source to the light valve; and
   the projection type zoom lens according to claim 1, wherein:
   the light beam from the light source is subjected to light modulation by the light valve, and is projected onto a screen by the projection type zoom lens.

* * * * *